United States Patent
Zhang et al.

(10) Patent No.: US 9,401,824 B1
(45) Date of Patent: Jul. 26, 2016

(54) METHOD AND APPARATUS OF CHANNEL ESTIMATION IN MULTI-USER MASSIVE MIMO SYSTEMS

(71) Applicant: Hong Kong Applied Science and Technology Research Institute Company Limited, Hong Kong (HK)

(72) Inventors: Yuxian Zhang, Hong Kong (HK); Man Wai Kwan, Hong Kong (HK); Eric Kong Chau Tsang, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 0 days.

(21) Appl. No.: 14/864,847

(22) Filed: Sep. 24, 2015

(51) Int. Cl.
*H04L 1/02* (2006.01)
*H04L 25/02* (2006.01)
*H04B 7/04* (2006.01)
*H04L 5/00* (2006.01)

(52) U.S. Cl.
CPC .......... *H04L 25/0204* (2013.01); *H04B 7/0452* (2013.01); *H04L 5/0048* (2013.01)

(58) Field of Classification Search
CPC ............. H04L 25/0204; H04L 25/0232; H04L 5/0048; H04L 25/0228; H04L 25/0413; H04L 25/025; H04B 7/0452; H04B 7/0619; H04B 7/0617
See application file for complete search history.

(56) References Cited

U.S. PATENT DOCUMENTS

| | | | |
|---|---|---|---|
| 8,837,621 B2 | 9/2014 | Guey et al. | |
| 2003/0021332 A1* | 1/2003 | Li | H04L 25/0204 375/147 |
| 2010/0098042 A1* | 4/2010 | Dent | H04B 1/707 370/342 |
| 2010/0232525 A1* | 9/2010 | Xia | H04B 7/0626 375/259 |
| 2011/0235744 A1* | 9/2011 | Ketchum | H04B 7/0421 375/295 |
| 2012/0288022 A1* | 11/2012 | Guey | H04B 7/0691 375/267 |
| 2013/0163544 A1 | 6/2013 | Lee et al. | |
| 2015/0016379 A1* | 1/2015 | Nam | H04B 7/0456 370/329 |
| 2015/0163073 A1* | 6/2015 | Jindal | H04L 25/0204 375/267 |
| 2015/0382205 A1* | 12/2015 | Lee | H04B 7/0417 370/329 |

* cited by examiner

*Primary Examiner* — Syed Haider
(74) *Attorney, Agent, or Firm* — Ella Cheong Hong Kong; Sam T. Yip

(57) ABSTRACT

The presently claimed invention provides a method of channel estimation in a multi-user massive Multiple-Input Multiple-Output system. Candidate pilots are selected for each user equipment based on their spatial correlation matrices. Through determining the similarity of spatial correlation matrices among different user equipments, shared pilots among them can be found, and a base station can transmit a union set of pilots for channel estimation. The present invention is able to provide high channel estimation accuracy and reduce training signal resource.

19 Claims, 4 Drawing Sheets

# METHOD AND APPARATUS OF CHANNEL ESTIMATION IN MULTI-USER MASSIVE MIMO SYSTEMS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to a massive multi-input multi-output (MIMO) communication system. More particularly, the present invention relates to a method and an apparatus of channel estimation in a multi-user (MU) massive MIMO system.

BACKGROUND

Due to various advantages such as large beamforming gain and spatial multiplexing gain, and high spatial resolution, massive MIMO communications have attracted considerable interest for future deployment in next generation of cellular systems. In a massive MIMO system, a transmitter has a very large number of transmit antennas, e.g., greater than 100. The massive MIMO system can provide low dimension of the effective channel, reduced spatial dimension for channel estimation (CE), and optimal training signal.

Regarding downlink channel estimation of a frequency-division duplex (FDD) massive MIMO system with many user equipments (UEs), the number of training signals is in the order of the number of antennas when using cell-specific reference signals (CRS) given by the LTE standard. When the channel estimation is performed with dedicated pilots for each UE, the number of training signals is in the order of the number of UEs. Both of the above methods will consume a lot of resources for training signal.

U.S. Pat. No. 8,837,621 relates to methods for inserting scattered pilots into the transmit signals of orthogonal frequency-division multiplexing (OFDM) systems, for estimating channel properties on the basis of the scattered pilots, a multi-antenna OFDM transmitter, and an OFDM receiver. This invention uses traditional MIMO CE method including transmitting pilot reference signal on only a subset of antennas to reduce overhead, and spatial interpolation to obtain the channels estimates for other antennas. Nevertheless, estimation error is large when the spatial correlation is not high enough.

US 20150016379 relates to a MIMO transmission method including: grouping users based on channel spatial correlation with predetermined group-specific correlation matrices and a predetermined threshold; and using eigenvectors of group-specific correlation matrix as pilots to perform channel estimation for the group users. However, the pilots for each group may not cover all the spatial directions of each group user, thus degrading the CE accuracy.

US20130163544 discloses a method for beamforming and information feedback. This invention uses predetermined beamforming vectors, e.g., DFT columns For each UE, a single beamforming vector is selected with highest gain as precoder for data transmission. As no channel estimation is needed, many calculations are saved. Nevertheless, if instantaneous channel state information is not obtained, the beamforming gain and spatial multiplexing gain cannot be fully attained.

There is a need in the art to have a method for estimating the massive MIMO channel with high accuracy and reduced training signal resource requirement. This method is particularly usable in the presence of many UEs during downlink channel estimation.

SUMMARY OF THE INVENTION

Accordingly, the presently claimed invention provides a method of channel estimation in a multi-user (MU) massive Multiple-Input Multiple-Output (MIMO) system. The present invention also provides a base station (BS) using this channel-estimation method.

In accordance to an embodiment of the presently claimed invention, a method of channel estimation in a MU massive MIMO system comprises: obtaining or generating, by a base station (BS), a plurality of candidate pilots, wherein each of the candidate pilots is assigned with an index for identification; obtaining a spatial correlation matrix for each of plural user equipments (UEs); obtaining, for an individual UE, a dominant spatial correlation matrix from the spatial correlation matrix of the individual UE; computing, for the individual UE, an average received signal strength corresponding to an individual candidate pilot based on the dominant spatial correlation matrix of the individual UE; selecting, for the individual UE, a subset of the candidate pilots used for channel estimation, wherein the individual candidate pilot is determined to be in the subset if the average received signal strength corresponding to the individual candidate pilot is higher than a threshold; grouping the subsets of the candidate pilots used for channel estimation to form an union set of pilots for the UEs; broadcasting, to the UEs, the indices of the candidate pilots belonging to the union set of the pilots; transmitting the union set of the pilots from the BS to the UEs; and performing channel estimation at the UEs based on the transmitted union set of the pilots and the broadcast indices of the candidate pilots.

In accordance to an embodiment of the presently claimed invention, a base station (BS) for communicating with plural user equipments (UEs) for a multi-user (MU) massive Multiple-Input Multiple-Output (MIMO) system, the BS comprising a radio-frequency (RF) generator, and one or more processors configured to execute a channel-estimation process, wherein the channel-estimation process comprises: obtaining or generating a plurality of candidate pilots, wherein each of the candidate pilots is assigned with an index for identification; for an individual UE, determining a dominant spatial correlation matrix from a spatial correlation matrix of the individual UE; for the individual UE, computing an average received signal strength corresponding to an individual candidate pilot based on the dominant spatial correlation matrix of the individual UE; for the individual UE, selecting a subset of the candidate pilots used for channel estimation, wherein the individual candidate pilot is determined to be in the subset if the average received signal strength corresponding to the individual candidate pilot is higher than a threshold; grouping the subsets of the candidate pilots used for channel estimation to form an union set of pilots for the UEs; configuring the RF generator to broadcast to the UEs the indices of the candidate pilots belonging to the union set of the pilots; and configuring the RF generator to transmit the union set of the pilots to the UEs, such that channel estimation at the UEs is achievable based on the received union set of the pilots and the broadcast indices of the candidate pilots.

In accordance to an embodiment of the presently claimed invention, a channel-estimation method for a full dimension (FD) Multiple-Input Multiple-Output (MIMO) system having a base station (BS) and plural user equipments (UEs), the BS having an antenna array having a plurality of rows representing elevation and a plurality of columns representing azimuth, the method comprising: obtaining or generating, by the BS, a first and a second sets of candidate pilots, wherein each of the candidate pilots is assigned with an index for identification; obtaining a vertical channel correlation matrix for each of the UEs; obtaining, for an individual UE, a first dominant spatial correlation matrix from the vertical channel correlation matrix of the individual UE; computing, for the individual UE, a first average received signal strength corresponding to an individual candidate pilot in the first candidate-pilot set, based on the first dominant spatial correlation matrix of the individual UE; selecting, for the individual UE, a first subset of candidate pilots used for channel estimation from the first candidate-pilot set, wherein the individual candidate pilot in the first candidate-pilot set is determined to be in the first subset if the first average received signal strength corresponding to the aforesaid individual candidate pilot is higher than a threshold; grouping the first subsets of candidate pilots used for channel estimation to form an first union set of pilots for the UEs; broadcasting, to the UEs, the indices of the candidate pilots belonging to the first union set of the pilots; obtaining a horizontal channel correlation matrix for each of the UEs; obtaining, for the individual UE, a second dominant spatial correlation matrix from the horizontal channel correlation matrix of the individual UE; computing, for the individual UE, a second average received signal strength corresponding to an the individual candidate pilot in the second candidate-pilot set, based on the second dominant spatial correlation matrix of the individual UE; selecting, for the individual UE, a second subset of candidate pilots used for channel estimation from the second candidate-pilot set, wherein the individual candidate pilot in the second candidate-pilot set is determined to be in the second subset if the second average received signal strength corresponding to the aforesaid individual candidate pilot is higher than the threshold; grouping the second subsets of candidate pilots used for channel estimation to form a second union set of pilots for the UEs; broadcasting, to the UEs, the indices of the candidate pilots belonging to the second union set of the pilots; obtaining, by the BS, pilots for the antenna array based on the first and the second union sets of pilots; transmitting the pilots for the antenna array from the BS to the UEs; and performing channel estimation at the UEs based on the received pilots and the broadcast indices of the candidate pilots belonging to each of the first and the second union sets.

The method of the present invention is able to provide high channel estimation accuracy and reduce training signal resource requirement.

BRIEF DESCRIPTION OF THE DRAWINGS

Embodiments of the present invention are described in more detail hereinafter with reference to the drawings, in which.

DETAILED DESCRIPTION

In the following description, methods of channel estimation in MU massive MIMO systems and the corresponding apparatus are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
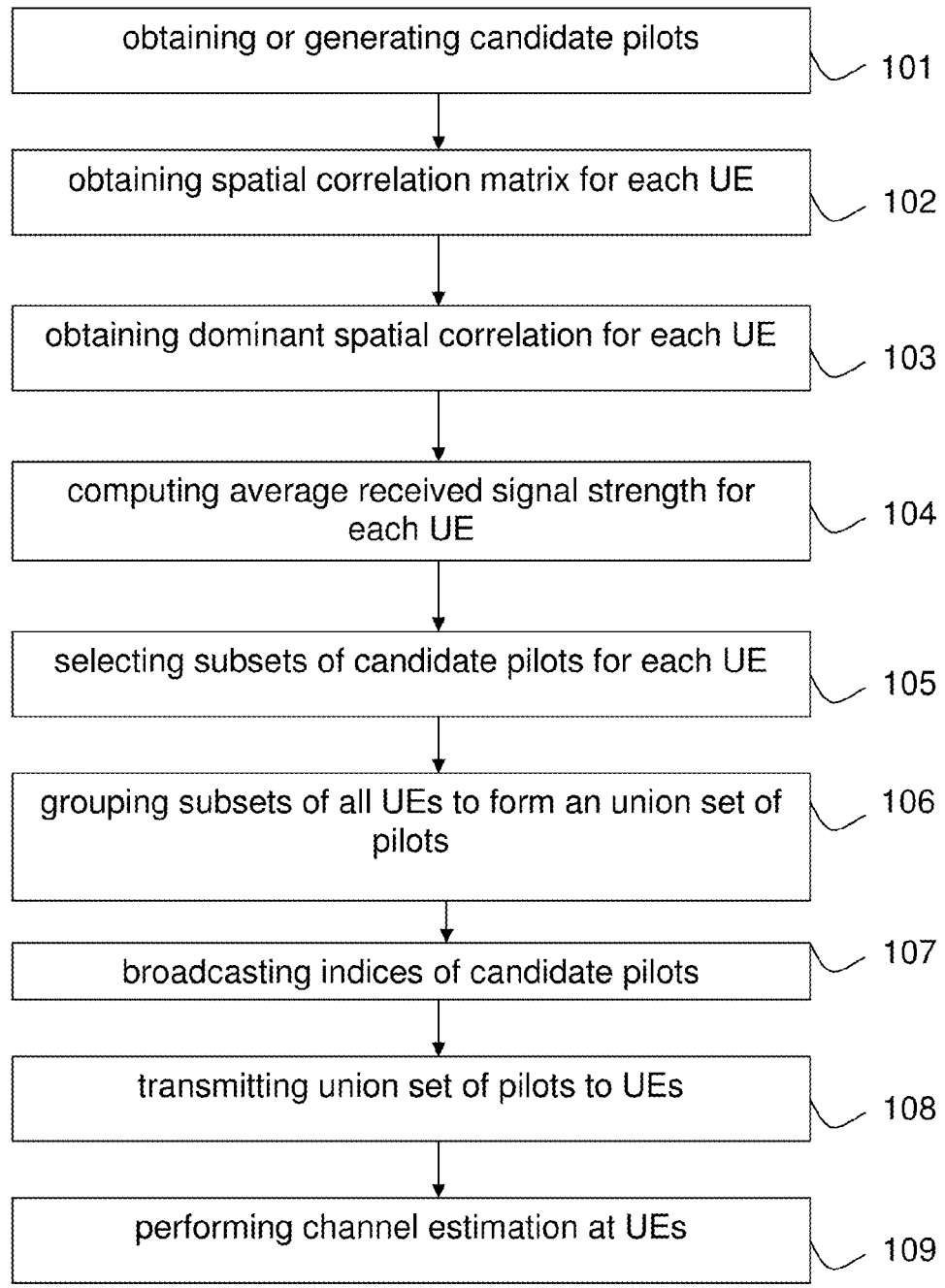
FIG. 1 is a flowchart illustrating a method of channel estimation in a MU massive MIMO system according to an embodiment of the presently claimed invention.

FIG. 1 is a flowchart illustrating a method of channel estimation for a MU massive MIMO system according to an embodiment of the presently claimed invention. In step 101, a BS obtains or generates a plurality of candidate pilots for channel estimation, and each of the candidate pilots is assigned with an index for identification. The candidate pilots may be some predetermined pilots, or pilots generated by a certain algorithm. In general, the candidate pilots are pilots that are obtained or generated without a need to consider channel state information of the UEs. Nevertheless, the present invention is not limited only to the case of not considering such information in performing the step 101. Pilots or training signals to be used in channel estimation for each individual UE are selected from the candidate pilots. In step 102 a spatial correlation matrix for each of plural UEs is obtained. In step 103, a dominant spatial correlation matrix for an individual UE is obtained from the spatial correlation matrix of the individual UE. In step 104, an average received signal strength corresponding to an individual candidate pilot for the individual UE is computed based on the dominant spatial correlation matrix of the individual UE. In step 105, a subset of the candidate pilots used for channel estimation is selected for the individual UE. If the average received signal strength corresponding to a candidate pilot is higher than a threshold, the candidate pilot is selected. In the presence of many UEs, it is possible that some of the candidate pilots may be shared by more than one UE when some of the UEs happen to be geographically close to each others, thereby reducing a training resource requirement in channel estimation for all the UEs. In step 106, all of the subsets of the candidate pilots used for channel estimation are grouped to form a union set of pilots for all of the UEs. In step 107, the indices of the candidate pilots belonging to the union set of the pilots are broadcast to all of the UEs. In step 108, the union set of the pilots is transmitted from the BS to the UEs. In step 109, channel estimation at the UEs is performed based on the transmitted union set of the pilots and the broadcasted indices of the candidate pilots.

Figure 2:
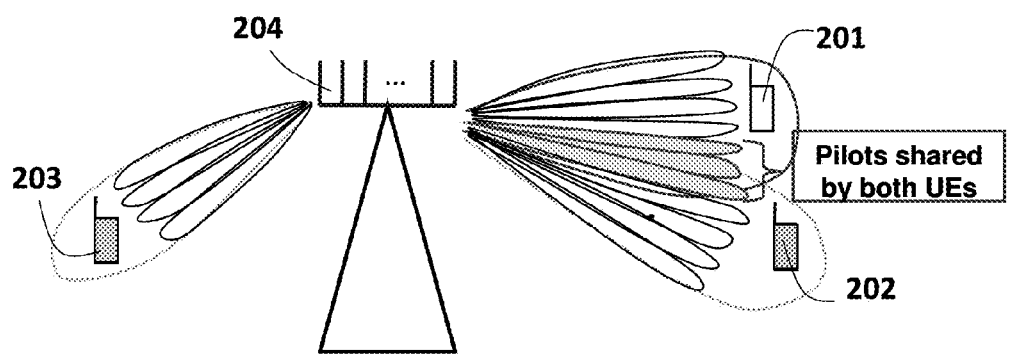
FIG. 2 depicts a BS transmitting pilots to multiple UEs according to an embodiment of the presently claimed invention.

FIG. 2 depicts a BS transmitting pilots to multiple UEs according to an embodiment of the present claimed invention. The system comprises three UEs including an UE1 201, an UE2 202, and an UE3 203, and a BS 204. As the angles of arrival between the UE1 201 and UE2 202 are closes to each other, some candidate pilots largely lie inside both dominant eigenspace of R1 and R2 where R1 and R2 are spatial correlation matrices of the UE1 201 and of the UE2 202, respectively. The candidate pilots that lie inside the dominant eigenspace can be shared with more than one user equipment so that the training expense, e.g., the number of pilots, can be substantially reduced. In the present invention, through determining the similarity of spatial correlation matrices among different UEs, shared pilots can be found, and a union set of pilots are transmitted, thus reducing the total training signals. Exemplarily, the similarity of spatial correlation matrices among the UEs is determined through the degree of correlation of the set of dominant eigenvectors of one UE to that of another UE.

Further elaborations on the steps 101-106 according to some embodiments of the presently claimed invention are given as follows.

In the step 101, preferably the candidate pilots are orthogonal to each other. In one embodiment, the candidate pilots are formed by columns of a DFT matrix.

In the step 102, the spatial correlation matrix can be determined by estimating the spatial correlation in channel measurement. According to an embodiment of the presently claimed invention, the spatial correlation matrix is determined through channel sounding by a reference signal, e.g., sounding reference signal (SRS) in LTE. At first, an uplink spatial correlation matrix is estimated through channel sounding by a reference signal as shown below:

$$R = E[hh^H]$$

where h is a channel vector.

Then, a downlink spatial correlation matrix for the individual UE is determined as the downlink spatial correlation matrix matches with the uplink spatial correlation matrix.

In the step 103, the dominant spatial correlation matrix can be determined by considering the dominant eigenspace of the spatial correlation matrix in order to reduce computation complexity. For example, the dominant spatial correlation matrix is calculated by reducing the size of the spatial correlation matrix (R). The spatial correlation matrix is defined as $$R = Q\Lambda Q^H, \Lambda = \text{diag}(\lambda_1, \ldots, \lambda_N) \in C^{N \times N}, Q = [q_1, \ldots, q_N] \in C^{N \times N},$$

where Q denotes eigenvectors of R, $\lambda_i$ denotes an i th largest eigenvalue of R, and $q_i$ denotes an eigenvector corresponding to the i th largest eigenvalue of R. The dominant spatial correlation matrix ($R_d$) is given by $$R_d = Q_d \Lambda_d Q_d^H, \Lambda_d = \text{diag}(\lambda_1, \ldots, \lambda_r) \in C^{r \times r}, Q_d = [q_1, \ldots, q_r] \in C^{N \times r}$$

where r denotes the number of dominant eigenvalues, and $Q_d$ is formed by the r eigenvectors corresponding to the r largest eigenvalues.

In the step 104, the average received signal strength corresponding to an individual candidate pilot is determined based on the dominant spatial correlation matrix:

$$P_i = \sum_{n=1}^{r} \lambda_n |f_i^H q_n|^2 = \|f_i^H (Q_d \Lambda_d^{1/2})\|_F^2 = f_i^H R_d f_i$$

where $P_i$ is an average received signal strength corresponding to an i th candidate pilot ($f_i$), and $R_d$ is the dominant spatial correlation matrix of an UE.

In the step 105, the subset of the candidate pilots used for channel estimation can be determined by $$S = \{i : P_i > \beta \cdot \max P_i\}$$

where S is the subset of candidate pilot, $P_i$ is an i th average received signal, and $\beta$ is a threshold factor. When an average received signal is larger than the product of the threshold factor $\beta$ and the maximum value of the average received signal, the corresponding candidate pilot is added into the subset.

Figure 3A:
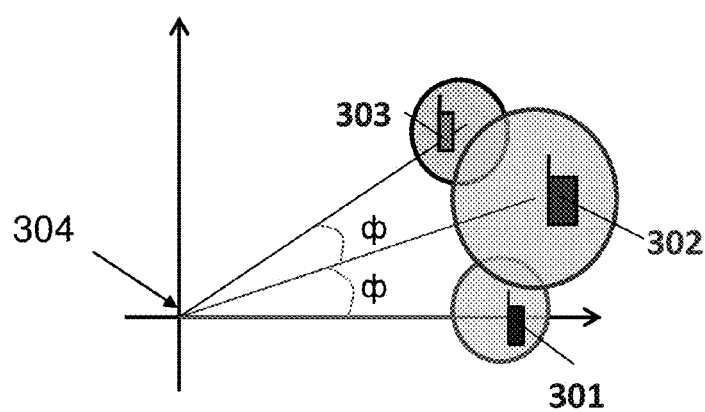
FIG. 3A depicts a BS transmitting pilots to three UEs according to an embodiment of the presently claimed invention.
Figure 3B:
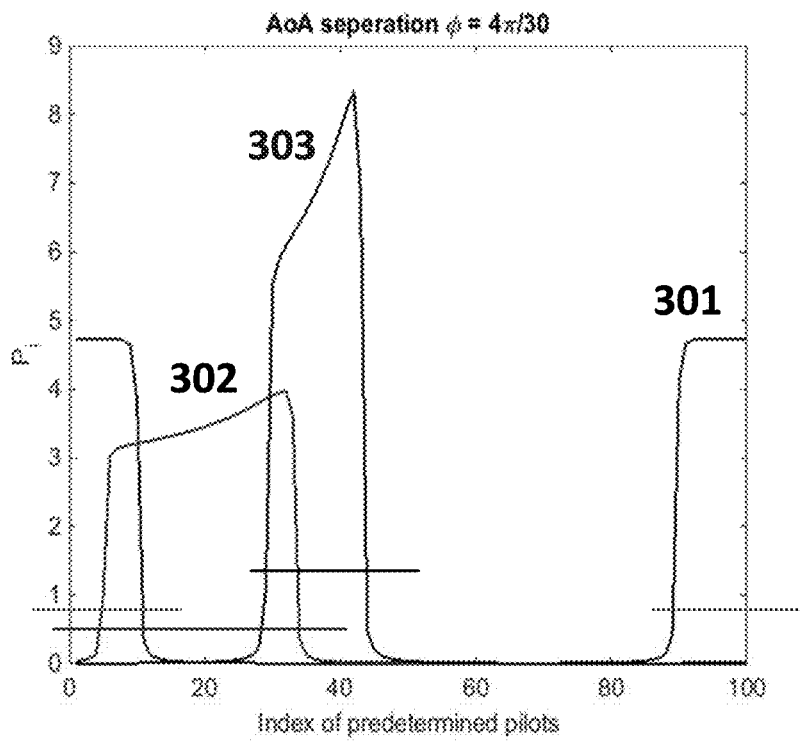
FIG. 3B is a graph showing values of average signal strength corresponding to different candidate pilots for the three UEs according to the set-up of FIG. 3A.

FIGS. 3A and 3B are used as an example to illustrate determination of the subset of the pre-determined pilots for channel estimation. In FIG. 3A, there are three UEs including an UE1 301, an UE2 302, and an UE3 303, and a BS 304 located at the origin. The angles of arrival (AoAs) for the UE1 301, UE2 302, and UE3 303 are 0°, ϕ, and 2ϕ respectively. When the AoA separation is 4π/30, the average received signals corresponding to different candidate pilots for each of the UEs are plotted against the indices of such candidate pilots as shown in FIG. 3B. Some of the candidate pilots are selected when the average received signals corresponding to the candidate pilots are greater than a threshold. As seen from FIG. 3B, the UE2 301 shares some of its candidate pilots with the UE1 302 and UE3 303.

In the step 106, as all of the sets of the candidate pilots used for channel estimation are grouped together to form a union set of pilots for all of the UEs, different UEs with similar spatial correlation can share some pilots such that training overheads can be reduced. It is illustrated by FIG. 4.

Figure 4:
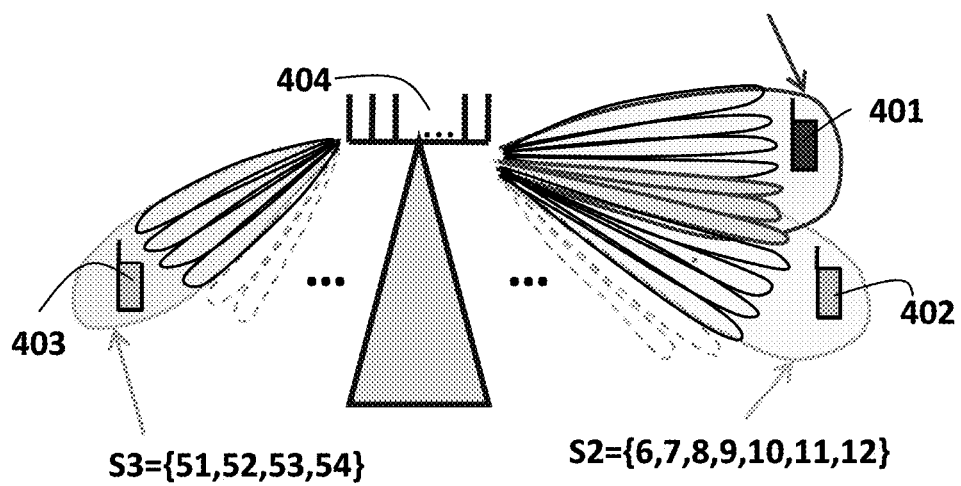
FIG. 4 depicts a BS transmitting an union set of pilots to three UEs according to an embodiment of the presently claimed invention.

In FIG. 4, there are three UEs including an UE1 401, an UE2 402, and an UE3 403, and a BS 404. The UE1 401 corresponds to a first subset of candidate pilots with S1={2, 3,4,5,6,7,8}, the UE2 402 corresponds to a second subset of candidate pilots with S2={6,7,8,9,10,11,12}, and the UE3 403 corresponds to a third subset of candidate pilots with 53={51,52,53,54}. After grouping the three subsets of candidate pilots, the BS transmits a union set of pilots with S={2~12, 51~54} to the three UEs. As the UE1 401 and UE2 402 share the candidate pilots with indices 6~8, the total number of the pilots transmitted to the three UEs is reduced, thus reducing downlink training expense.

Figure 5:
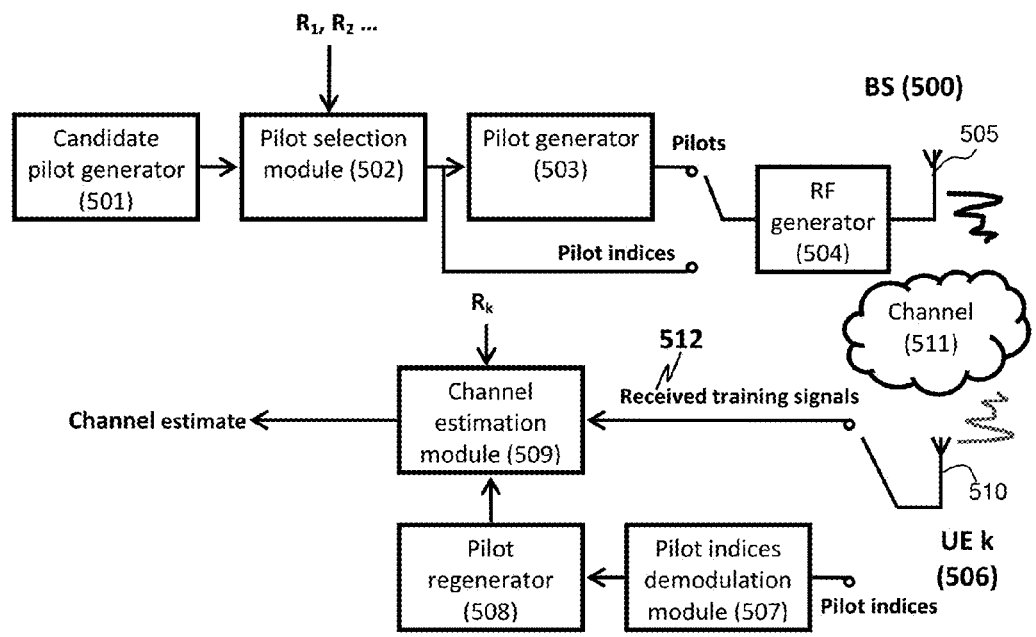
FIG. 5 is a flowchart diagram depicting a MU massive MIMO system according to an embodiment of the presently claimed invention.

FIG. 5 is a flowchart diagram depicting a MU massive MIMO system according to an embodiment of the presently claimed invention. A BS 500 comprises a candidate pilot generator 501, a pilot selection module 502, a pilot generator 503, a radio frequency generator 504 and BS antennas 505. An $UE_K$ 506 comprises a pilot indices demodulation module 507, a pilot regenerator 508, and a channel estimation module 509, and UE antennas 510. The candidate pilot generator 501 generates a plurality of candidate pilots. The pilot selection module 502 selects a suitable candidate pilot for channel estimation according to any embodiment of the method of the present invention. The pilot generator 503 generates pilots, which are further sent to the radio frequency generator 504 and then transmitted over a radio channel 511 through the BS antennas 505. The pilot indices are also broadcast through the radio frequency generator 504 and the BS antennas 505 over the channel 511. The $UE_K$ 506 then uses the pilot indices demodulation module 507 to obtain the pilot indices. To perform channel estimation for the $UE_K$ 506, the pilots are received at the UE antennas 510 through the channel 511 to yield received training signals 512. The pilot indices obtained from the pilot indices demodulation modules 507 are used to regenerate the pilots by the pilot regenerator 508. The channel estimation module 509 performs channel estimation at the $UE_K$ 506 based on the regenerated pilots and the received training signals 512.

Figure 6:
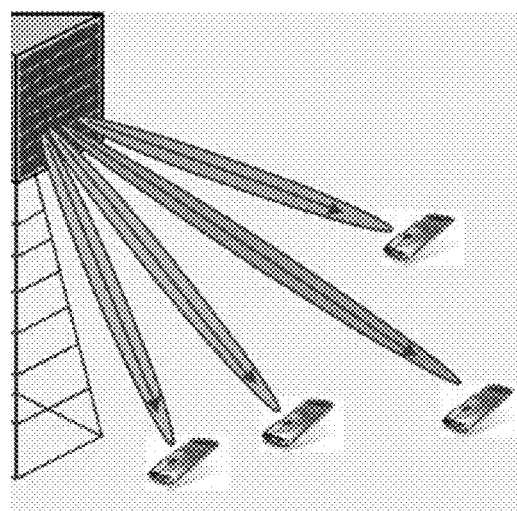
FIG. 6 depicts a full dimension MIMO system according to an embodiment of the presently claimed invention.

FIG. 6 depicts a full dimension (FD) MIMO system according to an embodiment of the presently claimed invention. The FD MIMO system comprises N×M antenna array 601 with N rows (representing elevation) and M columns (representing azimuth). A vertical channel correlation matrix is obtained by $R_v \in C^{N \times N}$ and a horizontal channel correlation matrix is obtained by $R_t \in C^{M \times M}$ such that h:MN×1 vectorized channel from the BS to the UE with correlation $$R = E[hh^H] = R_t \otimes R_v \in C^{MN \times MN}$$

where $\otimes$ denotes the Kronecker product.

The selection of pilots in vertical and horizontal dimensions can be separated. At first, the pilots for each dimension using $R_v$ and $R_t$ are found. Then, Kronecker product is used to obtain pilots for the antenna array, denoted by f, as below:

$$f = f_t \otimes f_v$$

where $f_t$, with dimension M×1, denotes a pilot in a horizontal direction, and $f_v$, with dimension N×1, denotes a pilot in a vertical direction. Note that f has a dimension MN×1.

The embodiments disclosed herein may be implemented using a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the software or electronic art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A channel-estimation method for a multi-user (MU) massive Multiple-Input Multiple-Output (MIMO) system having a base station (BS) and plural user equipments (UEs), the method comprising:
   obtaining or generating, by the BS, a plurality of candidate pilots, wherein each of the candidate pilots is assigned with an index for identification;
   obtaining a spatial correlation matrix for each of the UEs;
   obtaining, for an individual UE, a dominant spatial correlation matrix from the spatial correlation matrix of the individual UE;
   computing, for the individual UE, an average received signal strength corresponding to an individual candidate pilot, based on the dominant spatial correlation matrix of the individual UE;
   selecting, for the individual UE, a subset of the candidate pilots used for channel estimation, wherein the individual candidate pilot is determined to be in the subset if the average received signal strength corresponding to the individual candidate pilot is higher than a threshold;
   grouping the subsets of the candidate pilots used for channel estimation to form an union set of pilots for the UEs;
   broadcasting, to the UEs, the indices of the candidate pilots belonging to the union set of the pilots;
   transmitting the union set of the pilots from the BS to the UEs; and
   performing channel estimation at the UEs based on the received union set of the pilots transmitted from the BS and the broadcast indices of the candidate pilots.

2. The method of claim 1, wherein the candidate pilots are formed by columns of a discrete Fourier transform (DFT) matrix.

3. The method of claim 1, wherein the spatial correlation matrix is determined through channel sounding by a reference signal.

4. The method of claim 1, wherein the spatial correlation matrix is determined by:
   estimating an uplink spatial correlation matrix for the individual UE through channel sounding by a reference signal; and
   determining a downlink spatial correlation matrix for the individual UE as the spatial correlation matrix if the downlink spatial correlation matrix matches with the uplink spatial correlation matrix.

5. The method of claim 1, wherein the dominant spatial correlation matrix is determined based on dominant eigenvalues of the spatial correlation matrix of the individual UE.

6. The method of claim 1, wherein the dominant spatial correlation matrix ($R_d$) is determined by the following equation:

$$R_d = Q_d \Lambda_d Q_d^H, \Lambda_d = \text{diag}(\lambda_i, \ldots, \lambda_r) \in C^{r \times r}, Q_d = [q_1, \ldots, q_r] \in C^{N \times r},$$

where $(\cdot)^H$ denotes a Hermitian matrix, r denotes the number of dominant eigenvalues, $\lambda_i$ denotes the i th largest eigenvalue of the spatial correlation matrix, $q_i$ denotes an eigenvector corresponding to the i th largest eigenvalue of the spatial correlation matrix, N denotes a number of transmit antennas at the BS, and $Q_d$ is formed by the r eigenvectors corresponding to the r largest eigenvalues.

7. The method of claim 6, wherein the average received signal strength corresponding the candidate pilots is determined by the following equation:

$$P_i = \sum_{n=1}^{r} \lambda_n |f_i^H q_n|^2 = \|f_i^H (Q_d \Lambda_d^{1/2})\|_F^2 = f_i^H R_d f_i$$

where $f_i$ denotes an i th candidate pilots, and $P_i$ denotes an average received signal strength corresponding to the candidate pilot $f_i$.

8. The method of claim 7, wherein the subset of the candidate pilots (S) used for channel estimation is determined by the following equation:

$$S=\{i:P_i>\beta\cdot\max P_i\}$$

where i denotes an index of the candidate pilot, and β denotes a threshold factor.

9. A base station (BS) for communicating with plural user equipments (UEs) for a multi-user (MU) massive Multiple-Input Multiple-Output (MIMO) system, the BS comprising a radio-frequency (RF) generator, and one or more processors configured to execute a channel-estimation process, wherein the channel-estimation process comprises:

obtaining or generating a plurality of candidate pilots, wherein each of the candidate pilots is assigned with an index for identification;

for an individual UE, determining a dominant spatial correlation matrix from a spatial correlation matrix of the individual UE;

for the individual UE, computing an average received signal strength corresponding to an individual candidate pilot based on the dominant spatial correlation matrix of the individual UE;

for the individual UE, selecting a subset of the candidate pilots used for channel estimation, wherein the individual candidate pilot is determined to be in the subset if the average received signal strength corresponding to the individual candidate pilot is higher than a threshold;

grouping the subsets of the candidate pilots used for channel estimation to form an union set of pilots for the UEs;

configuring the RF generator to broadcast to the UEs the indices of the candidate pilots belonging to the union set of the pilots; and configuring the RF generator to transmit the union set of the pilots to the UEs, such that channel estimation at the UEs is achievable based on received union set of the pilots transmitted from the RF generator and the broadcast indices of the candidate pilots.

10. The BS of claim 9, wherein the candidate pilots are formed by columns of a discrete Fourier transform (DFT) matrix.

11. The BS of claim 9, wherein the channel-estimation process further comprises:

configuring the RF generator to transmit a reference signal to the individual UE for enabling the individual UE to estimate an uplink spatial correlation matrix thereof through channel sounding by the reference signal, whereby the spatial correlation matrix of the individual UE is determined as a downlink correlation matrix of the individual UE if the downlink spatial correlation matrix matches with the uplink spatial correlation matrix.

12. The BS of claim 9, wherein the dominant spatial correlation matrix is determined based on dominant eigenvalues of the spatial correlation matrix of the individual UE.

13. The BS of claim 9, wherein the dominant spatial correlation matrix ($R_d$) is determined by the following equation:

$$R_d=Q_d\Lambda_d Q_d^H, \Lambda_d=\text{diag}(\lambda_i,\ldots,\lambda_r)\in C^{r\times r}, Q_d=[q_1,\ldots,q_r]\in C^{N\times r},$$

where $(\cdot)^H$ denotes a Hermitian matrix, r denotes the number of dominant eigenvalues, $\lambda_i$ denotes the i th largest eigenvalue of the spatial correlation matrix, $q_i$ denotes an eigenvector corresponding to the i th largest eigenvalue of the spatial correlation matrix, N denotes a number of transmit antennas at the BS, and $Q_d$ is formed by the r eigenvectors corresponding to the r largest eigenvalues.

14. The BS of claim 13, wherein the average received signal strength corresponding the candidate pilots is determined by the following equation:

$$P_i = \sum_{n=1}^{r} \lambda_n|f_i^H q_n|^2 = \|f_i^H(Q_d\Lambda_d^{1/2})\|_F^2 = f_i^H R_d f_i$$

where $f_i$ denotes an i th candidate pilots, and $P_i$ denotes an average received signal strength corresponding to the candidate pilot $f_i$.

15. The BS of claim 14, wherein the subset of the candidate pilots (S) used for channel estimation is determined by the following equation:

$$S=\{i:P_i>\beta\cdot\max P_i\}$$

where i denotes an index of the candidate pilot, and β denotes a threshold factor.

16. A channel-estimation method for a full dimension (FD) Multiple-Input Multiple-Output (MIMO) system having a base station (BS) and plural user equipments (UEs), the BS having an antenna array having a plurality of rows representing elevation and a plurality of columns representing azimuth, the method comprising:

obtaining or generating, by the BS, a first and a second sets of candidate pilots, wherein each of the candidate pilots is assigned with an index for identification;

obtaining a vertical channel correlation matrix for each of the UEs;

obtaining, for an individual UE, a first dominant spatial correlation matrix from the vertical channel correlation matrix of the individual UE;

computing, for the individual UE, a first average received signal strength corresponding to an individual candidate pilot in the first candidate-pilot set, based on the first dominant spatial correlation matrix of the individual UE;

selecting, for the individual UE, a first subset of candidate pilots used for channel estimation from the first candidate-pilot set, wherein the individual candidate pilot in the first candidate-pilot set is determined to be in the first subset if the first average received signal strength corresponding to the aforesaid individual candidate pilot is higher than a threshold;

grouping the first subsets of candidate pilots used for channel estimation to form a first union set of pilots for the UEs;

broadcasting, to the UEs, the indices of the candidate pilots belonging to the first union set of the pilots;

obtaining a horizontal channel correlation matrix for each of the UEs;

obtaining, for the individual UE, a second dominant spatial correlation matrix from the horizontal channel correlation matrix of the individual UE;

computing, for the individual UE, a second average received signal strength corresponding to an individual candidate pilot in the second candidate-pilot set, based on the second dominant spatial correlation matrix of the individual UE;

selecting, for the individual UE, a second subset of candidate pilots used for channel estimation from the second candidate-pilot set, wherein the individual candidate pilot in the second candidate-pilot set is determined to be in the second subset if the second average received signal strength corresponding to the aforesaid individual candidate pilot is higher than the threshold;

grouping the second subsets of candidate pilots used for channel estimation to form a second union set of pilots for the UEs;

broadcasting, to the UEs, the indices of the candidate pilots belonging to the second union set of the pilots;

obtaining, by the BS, pilots for the antenna array based on the first and the second union sets of pilots;

transmitting the pilots for the antenna array from the BS to the UEs; and performing channel estimation at the UEs based on the received pilots transmitted from the BS and the broadcast indices of the candidate pilots belonging to each of the first and the second union sets.

17. The method of claim 16, wherein the pilots for the antenna array are obtained by computing $f = f_t \otimes f_v$ where f with dimension MN×1 contains the pilots for the antenna array, $f_t$ with dimension M×1 contains the candidate pilots specified in the second subset, and $f_v$ with dimension N×1 contains the candidate pilots specified in the first subset, $\otimes$ denotes the Kronecker product, N is the number of the rows in the antenna array, and M is the number of the columns in the antenna array.

18. The method of claim 16, wherein the candidate pilots are formed by columns of a discrete Fourier transform (DFT) matrix.

19. The method of claim 16, wherein each of the vertical channel correlation matrix and the horizontal channel correlation matrix is determined through channel sounding by a reference signal.

* * * * *